2,953,539

COMPOSITION COMPRISING A RUBBERY REACTION PRODUCT OF AN ORGANIC POLYISOCYANATE AND A DIHYDROXY TERMINATED POLYESTER

Orin C. Keplinger, Cuyahoga Falls, and Otto C. Elmer and Joe S. Duncan, Akron, Ohio, assignors to The General Tire & Rubber Company, Akron, Ohio, a corporation of Ohio No Drawing. Filed Nov. 4, 1957, Ser. No. 694,068

12 Claims. (Cl. 260—31.6)

This invention relates to curable rubbery polyester-urethane compositions. The present application is a continuation-in-part of our application Serial No. 663,624, filed June 5, 1957, of Orin C. Keplinger, Otto C. Elmer and Joe S. Duncan.

The high polymers of polyester-urethanes and particularly those which are composed predominantly of linear molecules have wide commercial possibilities since they have excellent abrasion resistance, oil resistance, tensile strength and other properties which are valuable for articles such as tires, belting and the like. However, their utilization has been greatly retarded because of their relatively poor low temperature performance as indicated by their high brittle points and stiffness at the lower temperatures, such as would be encountered in the arctic regions.

It is an object of the present invention to provide excellent low temperature performing polyester-urethane compositions which also maintain satisfactory high temperature performance.

It is another object to provide polyester-urethane polymers which have improved brittle points and are not as stiff as ordinary polyurethane, and are yet remarkably easy to cure.

It is an object to provide a process for preparing polyester-urethane compositions with lowered brittle points and improved flexibility at low tempeartures.

It is a further object of the present invention to provide polyurethane compositions which are relatively flexible at prolonged exposure to low temperatures in applications which do not require relatively high elongation.

We have found in accordance with the present invention that polyester-urethane compositions having excellent low temperature properties are obtained by using a mixture of glycols of which butylene-1,4-glycol is a substantial part in forming the polyester used to form the polyurethane polymer. These polymers which are formed by reacting about equal moles of an organic diisocyanate and a polyester should contain butylene-1,4-glycol in at least about 30 mole percent of glycols used to make the polyesters in order to obtain the lowest brittle points and the highest degree of non-stiffness at low temperatures such as those on the order of —30° C. or even less. It has also been found that when the butylene-1,4-glycol is used in amounts of more than 30 mole percent of the glycol of the polyester portion, the resultant polyurethane is remarkably easy to cure, requiring only about half the amount of dialkyl type peroxide curing agent as normally required, as hereafter described. When the amount of the butylene glycol is above 70 mole percent, the low temperature properties of the resulting polyurethane become greatly inferior apparently due to the crystallinity introduced therein by the regularity of the butylene units in the molecular chain. The major balance of the glycol used to form the polyester of the present invention is preferably a glycol containing alkylene units of less than four carbon atoms such as propylene and preferably ethylene.

It has been found that the best all-around high and low temperature properties are obtained by using adipic acid as the dicarboxylic acid in the formation of the polyester. These poly(ethylene-butylene-1,4) adipates provide excellent tensile strength, abrasion resistance, and other valuable properties as well as flexibility at low temperatures. When an isosebacic acid mixture comprising principally ethyl suberic acid is used as the dicarboxylic acid to prepare the polyesters, further reduced stiffness at low temperatures is obtained, the stiffness generally being less than even the polyethylene butylene-1,4 adipate urethanes. However, some of the other physical properties, such as tensile strength and tear strength are not as satisfactory as desired for some applications requiring good performance at various temperatures.

In performance at low temperatures, the properties of brittleness and stiffness in the polymers are both important although for some applications it may be desirable to have one of a higher order than the other. While low temperature properties of the polyester-diisocyanate polymers may be improved by fabricating the molecular chain from chain segments of longer polymethylene glycols which have great mobility between their functional end groups, apparently the tendency toward crystallization for such a chain is very great. This strong tendency to crystallize on the part of the molecular chain can be remarkably deterred by introducing a disorder in the molecular chain itself. This disorder is preferably introduced by varying the length and type of the linear chain segment units themselves and including the introduction of branch chain segments. However, we have found that the amount of disorder and the loading of the chain itself with various substituents must be controlled within limits in order to obtain the flexibility and strength in the polyurethane over the temperature range to be met in service.

While the disorder introduced by side chains may effectively eliminate the tendency to crystallize, apparently the flexibility and brittle point of the polymer can be greatly influenced by a "glassing" phenomenon in which the chain segments become rigid and immobile at random locations along the molecular chains. This "glassing" effect occurs as the temperature is lowered to the glass transition temperature. These immobile glass segments then act as fulcrums for deforming forces and magnify the effect of the force of the bonds of the molecular chain itself. Thus the low temperature flexing properties of a polymer containing these glass segments may be inferior to that of a crystalline polymer which may have amorphous regions between its crystalline areas to absorb the shock caused by deforming forces. Thus it can be seen that desirable low temperature properties such as low brittle points and a high recovery to any strain caused by elongation may be provided for by controlling the type and number of chain segments.

It has been found that isosebacic acids which are a mixture of sebacic acid isomers, namely about 72 to 80 percent by weight of 2-ethyl suberic acid, 12 to 18 percent 2,5-diethyl adipic acid, and 6 to 10 percent sebacic acid are particularly effective, although 2-ethyl suberic acid may be used alone or in a mixture of acids in which it is at least 50% by weight to produce excellent low temperature rubbers. The mixture of sebacic acid isomers is a white crystalline solid at room temperature having a molecular weight of 202.24; other physical properties of the mixture are a viscosity at 80° C. of 78.5 centipoises, the density at 80° C. being 1.02 grams per milliliter, and a heat of vaporization at 226° C. of 107 calories per gram.

The dicarboxylic acids useful in the preparation of the polyester are dicarboxylic acids having preferably from 5 to 11 carbon atoms such as glutaric acid, adipic acid, suberic acid and sebacic acids, such as derivatives of the carboxylic acids above with some alkyl groups attached to the chain such as found in 2-ethyl suberic acid.

In accordance with the present invention, the polyurethane polymers are formed by a reaction of a dicarboxylic acid (which is preferably adipic and/or an isosebacic acid mixture), and an alkylene glycol which is at least about 30 mole percent of butylene-1,4-glycol. As aforesaid when the polyester portion has at least 30 mole percent of butylene-1,4-glycol, superior polyurethane materials are produced from the standpoint of ease of curing and very low brittle point, as well as lack of stiffness at low temperatures. The butylene-1,4-glycol units are preferably present in amounts of about 35 to 60 mole percent by weight of the glycol used.

When isosebacic acid which is a mixture of sebacic acid isomers containing about 72–80% 2-ethyl suberic acid, is used in place of adipic acid, the low temperature modulus or stiffening effects are reduced, although some of the other equally desirable physical properties are not as good. The isosebacic esters are preferably esterified with butylene-1,4-glycol but satisfactory results are also obtained by using other alkylene glycols, preferably having alkylene units of less than four carbon atoms. Thus it is contemplated that the polyester used as a base material for reaction with diisocyanate is prepared so that the resulting polyester is about 40 to 60 mole percent, and preferably 50 mole percent the residue of the glycol and the balance the residue of the dicarboxylic acid.

A suitable polyester may be prepared by stirring together ethylene glycol (5.4 moles) and butylene-1,4-glycol (3.6 moles), and charging the mixture into a reaction vessel containing 8.4 moles of adipic acid. The mixture is heated and refluxed to remove water and excess glycol and the reaction is stopped when the molecular weight of the linear polyester polymer product is about 2,000 and the acid number under 1, and the kinematic viscosity about 600 centistokes at 73° C.

The polyurethanes themselves are prepared by reaction generally of about .9 to 1.3 equivalent weights of an organic polyisocyanate which is preferably a diisocyanate to about 1 equivalent of polyester, although for best results the equivalent weight ratio should be about .95 to 1.2 in order to obtain the most satisfactory processability as well as other desirable physical properties. While over 1.3 equivalents of polyisocyanate may be used, the product is not readily milled and calendered. Thus 1.4 or even up to 1.5 equivalents may be used if millable, calenderable compositions are not required. As to suitable organic diisocyanates, various aliphatic and aromatic diisocyanates are commercially available such as 2,4-tolylene diisocyanate, p,p'-diisocyanato diphenyl methane, naphthalene-1,5-diisocyanate and hexamethylene diisocyanate.

Readily reactive diisocyanates having both isocyanate groups of about equal reactivity are preferred for at least part of the total isocyanate present to facilitate growth of the polyurethane chains. Trifunctional isocyanates and like trifunctional polyesters act as crosslinking agents and are undesirable in appreciable quantity unless one of the functional groups is relatively nonreactive.

In forming the polyurethane material, the polyester and diisocyanate are mixed together and allowed to polymerize at any suitable temperature, preferably at a temperature of about 115°, or 100° to 140° C. for as short a time as 15 minutes although a time of 4 to 8 hours is preferred. Polymerization at room temperature requires a much longer time. The resultant polymer then may be combined with carbon black by milling in the black at a rate of about 5 to 80 parts or preferably 15–40 parts by weight based on 100 parts by weight of the polyurethane. The carbon black provides superior properties such as improved tensile strength and tear strength as well as wear and abrasion resistance. Other dry pigments such as clay, calcined Hi-Sil, or calcium carbonate may be substituted for all or part of the carbon black to give the vulcanized material substantial reinforcement.

After the compounding and milling, the polyurethanes are generally cured for about 10 to 120 minutes at approximately 35 to 75 pounds steam pressure. The preferable curing agent is a dialkyl peroxide curing agent such as dicumyl peroxide (2,2'-bis(2,2'-phenyl) peroxy propane), as disclosed in the copending application of Keplinger and Gruber, Serial No. 535,280, filed September 10, 1955.

The organic peroxides apparently withdraw hydrogen atoms from activated methylene groups of polymers to form free radicals in their respective chains which can cross-link the molecular chains together. Suitable peroxide curing agents are of the general formula

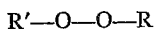

R'—O—O—R where R and R' are unsubstituted organic groups including alkyl, aralkyl and such groups containing one or more nonfunctional groups and/or alkyl groups and substitutes. The R and R' groups preferably contain an aliphatic group of at least 2 carbon atoms attached directly to a peroxide oxygen atom. While the best results are obtained with dicumyl peroxide, other preferred peroxide type-curing agents for carbon black stocks are di-t-butyl peroxide, di-2,2'-bis (t-butyl) peroxy butane, and chlorine substituted dialkyl peroxides such as 2,2, bis (dichlorophenyl) isopropyl peroxide. Also effective in carbon black polyurethane rubber compositions are isopropyl peroxide, methyl cumyl peroxide, cumyl-cymyl peroxide, t-butyl peroxide and 1-isobutoxy-1-cumyl peroxy ethane. For non-black stocks, suitable peroxides are t-butyl perbenzoate, lauryl peroxide, and benzoyl peroxide. The dialkyl-type peroxides are preferably used in amounts of 0.5 to 8 percent by weight of the polyurethane.

When an organic peroxide is used for the main curing agent, the total amount of diisocyanate used per mole of polyester used may be less than when no peroxide is used and is preferably in the range of 0.97 to 1.04 moles. Generally the range of total diisocyanate used should be at least 0.95 mole and no more than 1.2 moles.

EXAMPLE I

A series of long chain polyurethane polymers were prepared by reacting about equal moles of dihydroxy polyesters with organic diisocyanates as indicated in Table I. The reaction mixture was allowed to stand in a closed container for 6 hours at a temperature of 115° C. The resultant polymer was masticated on a rubber mill with the following ingredients to form a series of homogeneous mixtures, as indicated below:

| Ingredients: | Parts by weight |
|---|---|
| Polymer | 100 |
| Carbon black (EPC) | 25 |
| Dicumyl peroxide: (2,2'-bis(2,2'-phenyl) peroxy propane) | 3 |

These polymers were tested along with other rubbery materials such as GR-S and natural rubber. Brittle points of these compounds were determined according to ASTM D746–55T, using acetone and Dry Ice for the cooling medium.

Table 1

POLYMER

| Sample No. | Polyurethane Polyester | Polyurethane Diisocyanate | Type of Rubbery Polymer | Brittle Point (° C) |
|---|---|---|---|---|
| 1 | 60/40 poly (ethylene-butylene-1,4) adipate. | p,p'-diisocyanato diphenyl methane. | Polyurethane. | −70 |
| 2 | 67/33 poly (ethylene-propylene) isosebacate.[1] | do | do | −69 |
| 3 | 70/30 poly (ethylene-butylene-1,4) adipate. | do | do | −66 |
| 4 | 80/20 poly (ethylene-propylene) adipate + 0.5% butyl diethanolamine. | do | do | −65 |
| 5 | 80/20 poly (ethylene-propylene) adipate + 0.3% heptadecanol. | do | do | −63 |
| 6 | polyethylene isosebacate. | do | do | −63 |
| 7 | 80/20 poly (ethylene-propylene) adipate. | do | do | −62 |
| 8 | polyethylene glutarate. | do | do | −61 |
| 9 | polyethylene adipate + .5% 2-ethyl-butanol-1. | do | do | −55 |
| 10 | | | Natural Rubber treadstock. | −54 |
| 11 | 67/33 poly (ethylene-propylene) adipate. | p,p'-diisocyanato diphenyl methane. | Polyurethane. | −54 |
| 12 | 90/10 poly (ethylene-butylene-1,4) adipate. | do | do | −48 |
| 13 | | | GR-S (Copolymer of butadiene and styrene). | −47 |
| 14 | polyethylene adipate. | p,p'-diisocyanato diphenyl methane. | Polyurethane. | −45 |
| 15 | do | naphthalene-1,5-diisocyanate. | do | −45 |
| 16 | 70/30 poly (ethylene-butylene-1,3) adipate. | p,p'-diisocyanato diphenyl methane. | do | −38 |

[1] The isosebacate esters were prepared using a mixture of sebacic acid isomers containing 75% 2-ethyl suberic acid, 15% 2,5-diethyl adipic acid and 10% sebacic acid.

The GR-S and natural rubber compositions were prepared for the tests in the above table according to the following recipe:

GR-S FORMULA

| Ingredients: | Parts by weight |
|---|---|
| GR-S 1712 | 57.9 |
| GR-S 1500 | 42.1 |
| A fine furnace black (Philblack 0) | 48.90 |
| Stearic acid | 1.68 |
| Zinc oxide | 2.52 |
| Sulfur | 1.71 |
| Diphenylamine - acetone reaction products (B-L-E) | 0.42 |
| 6 - ethoxy-1,2-dihydro-2,2,4-trimethylquinoline (Santoflex AW) | 1.26 |
| Aromatic petroleum oil (Philrich 5) | 5.04 |
| Diphenyl ethylene diamine (Stabilite) | 0.42 |
| Paraffin | 2.65 |
| N-cyclohexyl - 2 - benzothiazole sulfenamide (Santocure) | 0.95 |

NATURAL RUBBER FORMULA

| | Parts by weight |
|---|---|
| Rubber | 100 |
| A fine furnace black (Philblack 0) | 75 |
| Stearic acid | 2 |
| Zinc oxide | 5 |
| Sulfur | 2 |
| N-cyclohexyl - 2 - benzothiazole sulfenamide (Santocure) | 1 |
| Softener | 35 |

Table I illustrates that a very low brittle point may be obtained by using butylene-1,4 and 2-ethyl suberic acid units in the molecular chains of the polymers. It is noted that the 60/40 poly (ethylene-butylene-1,4) adipate polyurethane and the 67/33 poly (ethylene-propylene) isosebacate polyurethane have the lowest brittle points, even lower than commercially used GR-S tire stock polymers. While the 67/33 poly (ethylenepropylene) isosebacate urethane has a low brittle point, other equally important properties such as the room temperature properties including tear strength and tensile strength are relatively poor which render the polymer undesirable for articles such as tires, etc.

For many applications at low temperatures, the relative lack of stiffness as indicated by a relatively low modulus value, is more important than the brittle point of the polymer. The low temperature modulus values of a polymer and its changes with a decrease in temperature are illustrated in the following example:

EXAMPLE II

Polyester-urethane polymers were prepared in a manner similar to that of Example I. Their composition is shown in Table II, which also discloses the results of low temperature stiffness tests conducted on the polyurethane and GR-S polymers by the TR-50 test. In this test, the rubbers are stretched to a 50 percent elongation and the percent recovery of this strain is measured at various low temperatures. The more the retraction, the better the performance. Thus for a given percent retraction, the lower the temperature at which such retraction is possible, the better the low temperature performance.

Table II

| Sample No. | Description | Temperature (° Centigrade) Percent Retraction | | | |
|---|---|---|---|---|---|
| | | 90 | 70 | 50 | 10 |
| 1 | 70/30 poly (ethylene-butylene-1,4) isosebacate. | −22 | −33 | −36 | −42 |
| 2 | Commercial tread stock-copolymer of butadiene and styrene. | −20 | −30 | −32 | −41 |
| 3 | 60/40 poly (ethylene-butylene-1,4) adipate. | −17 | −27 | −32 | −40 |
| 4 | Polyethylene isosebacate. | −24 | −28 | −31 | −34 |
| 5 | 80/20 poly (ethylene-propylene) adipate. | −20 | −26 | −28 | −34 |
| 6 | 80/20 poly (ethylene-butylene-1,4) adipate. | −18 | −24 | −28 | −33 |
| 7 | 80/20 poly (ethylene-propylene) isosebacate. | −19 | −27 | −29 | −34 |
| 8 | 70/30 poly (ethylene-butylene-1,3) adipate. | −19 | −22 | −24 | −30 |
| 9 | 80/20 poly (ethylene-neopentyl) adipate. | −12 | −18 | −22 | −29 |
| 10 | 80/20 poly (ethylene-2,2-diethyl propanediol-1,3) adipate. | −10 | −18 | −23 | −29 |
| 11 | 67/33 poly (ethylene-propylene) adipate. | −14 | −18 | −21 | −26 |

The polyester-urethanes above were all prepared using methylene-bis-4-phenylisocyanate as the polyisocyanate compound. The specimens were precooled for one hour at −73° C. The temperature of the specimens was allowed to rise 1° C. per minute and the temperature recorded at 10%, 50%, 70% and 90% retraction.

It is noted that sample No. 1, containing butylene-1,4 glycol and 2-ethyl suberic acid units in its molecular chain, maintained a 10% retraction even at −42° C. which was an improvement over the performance of commercial GR–S tread stock. The 60/40 poly(ethylene-butylene-1,4) adipate urethane was also outstanding, having 10% retraction at a temperature very close to that of the GR–S rubber. The 80/20 poly(ethylene-propylene) adipate urethane not only exhibited a 10% retraction at a higher temperature than the GR–S rubbers, but other properties such as tear strength were greatly inferior to the GR–S rubber and polybutylene-1,4 glycol containing urethane samples numbered 1 and 3 in the above table.

EXAMPLE III

Samples of polyurethane polymers and GR–S tread stock were tested as in Example II. The results illustrate the great improvement obtained when butylene-1,4 glycol is used as a base material for the polyester in amounts of at least 30 mole percent.

*Table III*

| Sample No. | Description of Polymer (Polyurethanes prepared from reacting methylene-bis 4-phenylisocyanate with the designated polyester) | Temperature (° Centigrade) Percent Retraction | | | | |
|---|---|---|---|---|---|---|
| | | 90 | 70 | 50 | 30 | 10 |
| 1 | Polyethylene adipate | | | | −16 | −26 |
| 2 | 80/20 poly(ethylene-butylene-1,4) adipate | −18 | −25 | −28 | | −33 |
| 3 | 70/30 poly(ethylene-butylene-1,4) adipate | −19 | −28 | −32 | | −36 |
| 4 | 60/40 poly(ethylene-butylene-1,4) adipate | −17 | −27 | −32 | | −40 |
| 5 | GR–S Commercial tread stock | −20 | −28 | −32 | | −41 |

EXAMPLE IV

Low temperature stiffness tests were conducted on three polyurethane elastomers along with GR–S and natural rubber tread stocks in order to evaluate their tendency to crystallize under longer periods of storage at low temperature or their tendency to crystallize under relatively large stresses. The tendency to crystallize under prolonged exposure to low temperature was checked by a TR–50 test in which the samples were conditioned by a 48-hour exposure period at −70° C. at 50% elongation. The tendency to crystallize under high stress was investigated by a TR–250 test in which the samples were stretched to a 250 percent elongation. The percent retraction measured was calculated as the stiffness coefficient on the basis that the degree of stiffening is inversely proportional to the percentage retraction. Thus, the larger the stiffness coefficient, the stiffer the polymer.

*Table IV*

| Sample No. | Description | TR–50 Test—Conditioned 1 hr. @ −73°C. Temp. in °C. Stiffness Coefficient | | | | TR–50 Test—Conditioned 48 hrs. @ −70°C. Temp. in °C. Stiffness Coefficient | | | | TR–250 Test—Conditioned 1 hr. @ −70°C. Temp. in °C. Stiffness Coefficient | | | |
|---|---|---|---|---|---|---|---|---|---|---|---|---|---|
| | | 2 | 3 | 5 | 10 | 2 | 3 | 5 | 10 | 2 | 3 | 5 | 10 |
| 1 | Natural Rubber Tire Carcass Stock | −36 | −42 | −46 | −52 | −31 | −32 | −35 | −36 | −30 | −34 | −39 | −47 |
| 2 | GR–S Rubber tire tread stock | −28 | −32 | −33 | −35 | −21 | −23 | −25 | −26 | −33 | −37 | −38 | −40 |
| 3 | 80/20 poly(ethylene-propylene) adipate polyurethane | −22 | −27 | −29 | −30 | −23 | −25 | −27 | −28 | +1 | −12 | −21 | −26 |
| 4 | 60/40 poly(ethylene-butylene-1,4 adipate polyurethane | −27 | −31 | −32 | −33 | −24 | −29 | −32 | −33 | −7 | −16 | −24 | −29 |
| 5 | 60/40 poly(ethylene-butylene-1,4 isosebacate polyurethane | −34 | −35 | −36 | −38 | −32 | −34 | −35 | −37 | (¹) | | | |

¹ Insufficient elongation to reach 250% and sample could not be mounted for testing.

In the above table, the polyurethane polymers were prepared by reacting the designated polyesters with about equal moles of methylene-bis-4-phenylisocyanate. As seen in Table IV, equivalent stiffness coefficients were reached at higher temperatures in the case of some of the polyurethanes than in the case of the natural rubber or GR–S stocks. However, when the polymer compositions were conditioned for 48 hours prior to testing, the 60/40 poly(ethylene-butylene-1,4) adipate polyurethane and the 60/40 poly(ethylene-butylene-1,4) isosebacate polyurethane samples did not exhibit increased stiffness over samples which were conditioned for one hour at −70° C. Thus for rubber composition applications at consistently low temperature which do not require relatively high elongation, the above polyurethane rubber compositions are superior in stiffness properties to commercially used natural rubber and GR–S rubber stock compositions.

It has also been found in some cases that when the polyester chains are modified with certain compounds such as N-butyl-diethanol amine or terminated with 2-ethyl butanol-1, the brittle point of the resultant polyurethane polymers was reduced in substantial amounts as seen in Table I. The terminating agents, apparently require a hydroxyl group and main chain or side chain of at least 4 carbon atoms. The terminating agents are preferably reacted with the polyester and the polyisocyanate in amounts of .5 to 3 percent by weight of the polyester being preferred for best processing and lowering of the brittle point, although amounts as low as .1% and as high as 6 to 8% may be used.

Other chain terminators such as stearic acid and oleic acid apparently increase the brittle point to a slight extent.

Generally however, lubricating compounds such as stearic acid, oleic acid, Acrawax C, and silicone grease may be added to the polyurethane composition in small amounts of about ¹⁄₁₀ to 8 parts by weight per 100 parts of the urethane polymer to reduce the tendency of the polymer to stick to the surface of the mill. Lubricants such as stearic acid and oleic acid, for example, may cause an elevation in brittle point of the polyurethane although the resultant brittle point is still much lower than polyesterurethane compositions not prepared according to the present invention.

EXAMPLE V

This example illustrates the fact that the low temperature properties of stearic acid terminated polyesterurethanes are still of a high order. The example also illustrates the all around excellent high and low temperature properties of the polyester-urethanes of the present invention.

A series of 60/40 poly(ethylene-butylene-1,4) adipate-p,p′-diisocyanato diphenylmethane polyurethane compositions, which were terminated with 0.6 percent by weight of stearic acid, were compounded with Acrawax–C (a dusting agent having a melting point of 140–142° C. and a specific gravity of 0.975), high abrasion furnace carbon black, and dicumyl peroxide. The compounded polyurethanes were then cured at 60 pounds steam pressure (307° F.) for 45 minutes. The polyurethane compositions were tested for both high and low temperature properties, the results of which are shown below.

Table V

|  | A | B | C | D | E |
|---|---|---|---|---|---|
| NCO/OH ratio | 1.044 | 1.008 | 0.997 | 0.974 | 0.945 |
| Plasticity, Williams | 104 | 125 | 127 | 113 | 95 |
| Acrawax-C | 2 | 2 | 2 | 2 | 2 |
| Carbon black (HAF) | 25 | 25 | 25 | 25 | 25 |
| Dicumyl Peroxide | 0.8 | 1.2 | 2.0 | 2.4 | 2.4 |
| Mooney Scorch Test, ASTM Test D1077-49T |  | 30′(68–68) | 30′(19–23) | 30′(18–21) | 30′(0–0) |
| 300% Modulus (p.s.i.) | 1,075 | 1,400 | 2,325 | 2,900 | 2,430 |
| Tensile (p.s.i.) | 4,200 | 4,600 | 4,950 | 5,100 | 4,600 |
| Elongation (percent) | 750 | 680 | 500 | 450 | 450 |
| Set (percent) | 9.0 | 9.0 | 6.0 | 3.0 | 6.0 |
| Tear Strength (lbs./in.) | 263 | 245 | 240 | 186 | 190 |
| Shore "A" | 63 | 60 | 63 | 66 | 63 |
| 205° Tensile | 1,850 | 1,450 | 1,250 | 1,350 | 1,300 |
| Elongation (percent) | 600 | 400 | 240 | 210 | 240 |
| Compression Set percent | 36.5 | 27 | 12.4 | 8.5 | 9.2 |
| Rebound, Healey do | 64.1 | 64.6 | 67.8 | 69 | 67 |
| De Mattia flexes | 100,000+ | 100,000+ | 20,000 | 4,000 | 3,500 |
| Goodrich Flex: |  |  |  |  |  |
| Δ T (° F.) | (1) | (2) | 44 | 40 | 38 |
| Set (percent) | (1) | (2) | 4.1 | 2.4 | 2.1 |
| Low Temperature Tests: |  |  |  |  |  |
| Brittle Point (° C.) | −70 | Below −73 | Below −73 | Below −73 | Below −73 |

TEMPERATURE-RETRACTION TEST (° C.)

|  | A | B | C | D | E |
|---|---|---|---|---|---|
| TR-10 | −38.5 | −38.5 | −38.5 | −38.5 | −38.5 |
| TR-50 | −26 | −29.5 | −32.5 | −32.5 | −32 |
| TR-70 | −18 | −23 | −26 | −26 | −25 |
| TR-90 | −10 | −15 | −18 | −18 | −16 |

[1] Failed in 6 min.
[2] Failed in 9 min.

As seen in Table V, the low temperature properties are excellent. At the same time, other properties such as tensile strength, tear strength, 300% modulus, etc., are good.

It has been found that an octyl alcohol terminated polypropylene adipate can be used as a plasticizer to improve processing and also low temperature properties of polyurethanes. About 10 parts by weight of about 1 mole of polypropylene adipate terminated with preferably 2 moles of octyl alcohol may lower the brittle point of urethane polymers such as those of the present invention from 3 to 10° C. Generally, polyesters such as polypropylene adipate terminated with octyl alcohol of a higher molecular weight range, say of 2000 to 5000, generally lower the brittle point more than polyesters of a lower molecular weight range, say of 750 to 1500 up to 2000. Other polyesters, when compatible with the urethane polymer, such as polyethylene adipate or mixed poly (ethylene-propylene) adipates may be substituted for the polyester part of the octyl alcohol terminated-polypropylene adipate plasticizer. The octyl alcohol, which acts as a modifying agent, may be substituted for by other alcohols of relatively long chain lengths, such as heptyl alcohol and dodecyl alcohol, having up to 12 carbon atoms.

The octyl alcohol terminated polypropylene adipate plasticizer is generally used in amounts of 2 to 20 parts by weight of the urethane polymer, although up to 30 parts may be used before incompatibility restricts its use for most applications.

It is to be understood that in accordance with the provisions of the patent statutes, the particular form of product shown and described and the particular procedure set forth are presented for purposes of explanation and illustration and that various modifications of said product and procedure can be made without departing from our invention.

What we claim is:

1. A polyester-urethane composition comprising a rubbery reaction product of about 0.9 to 1.5 equivalent weights of an organic polyisocyanate having 2 to 3 isocyanate groups, the major portion of which is an organic diisocyanate and about one equivalent weight of a dihydroxy terminated polyester having a molecular weight of at least 500, which is a reaction product of an aliphatic dicarboxylic acid having 5 to 11 carbon atoms with a mixture of glycols consisting essentially of about 30 to 70 mole percent of butylene-1,4-glycol and 70–30 mole percent of an alkylene glycol of less than 4 carbon atoms.

2. A polyester-urethane composition comprising a rubbery reaction product of about one mole of an organic diisocyanate and about one mole of a dihydroxy terminated polyester having a molecular weight of at least 500 which is the reaction product of an aliphatic dicarboxylic acid of 5 to 11 carbon atoms with a mixture of glycols consisting essentially of about 35 to 60 mole percent of butylene-1,4-glycol and 65 to 40 mole percent of at least one other alkylene glycol of less than 4 carbon atoms.

3. A polyester-urethane composition comprising a rubbery reaction product of about one equivalent weight of an organic polyisocyanate having 2 to 3 isocyanate groups, the major portion of which is an organic diisocyanate and about one equivalent weight of a dihydroxy terminated polyester having a molecular weight of at least 500 which is the reaction product of an organic aliphatic dicarboxylic acid having 5 to 11 carbon atoms with a mixture of glycols consisting essentially of 30 to 60 mole percent of butylene-1,4-glycol and 70 to 40 mole percent of an alkylene glycol of less than 4 carbon atoms.

4. A polyester-urethane composition comprising a rubbery reaction product of about .9 to 1.5 weight equivalents of an organic polyisocyanate having 2 to 3 isocyanate groups, the major portion of which is an organic diisocyanate and about one weight equivalent of a dihydroxy terminated polyester having a molecular weight of at least 500 prepared from the reaction of adipic acid with a mixture of glycols, said mixed glycols consisting essentially of about 30 to 70 mole percent of butylene-1,4-glycol and 70 to 30 mole percent of an alkylene glycol of less than 4 carbon atoms.

5. A polyester-urethane composition comprising a rubbery reaction product of about .9 to 1.2 equivalent weights of an organic polyisocyanate having 2 to 3 isocyanate groups, the major portion of which is an organic diisocyanate and about one equivalent weight of a dihydroxy terminated polyester having a molecular weight of at least 500 which is a reaction product of (1) a dicarboxylic acid mixture comprising about 72 to 80% by weight of 2-ethyl suberic acid, 12 to 18% 2,5-diethyl adipic acid and 6 to 10% sebacic acid and (2) mixture of glycols consisting essentially of at least about 35 to 60 mole percent of butylene-1,4-glycol and about 65 to 40 mole percent of ethylene glycol.

6. A polyester-urethane composition comprising a rubbery reaction product of (1) p,p'-diisocyanato diphenyl methane and (2) a polyester of an organic aliphatic dicarboxylic acid having 5 to 11 carbon atoms and a glycol mixture consisting essentially of about 60 to 40 mole percent of ethylene glycol and 40 to 60 mole percent of butylene-1,4-glycol, said composition having a brittle point not substantially higher than about −50° C.

7. A curable substantially linear polyurethane composition comprising a rubbery reaction product of (1) a polyester having a molecular weight of at least 500 which is a reaction product of adipic acid and a glycol mixture consisting essentially of 30 to 60 mole percent of butylene-1,4-glycol and 70 to 40 mole percent of ethylene glycol and (2) an organic polyisocyanate having 2 to 3 isocyanate groups, the major portion of which is an organic diisocyanate.

8. A polyester-urethane composition comprising a rubbery reaction product of (1) about 0.9 to 1.5 equivalent weights of an organic polyisocyanate having 2 to 3 isocyanate groups, the major portion of which is an organic diisocyanate (2) about one equivalent weight of a dihydroxy terminated polyester having a molecular weight of at least 500 prepared from reaction of an organic aliphatic dicarboxylic acid having 5 to 11 carbon atoms with a mixture of glycols consisting essentially of about 30 to 70 mole percent of butylene-1,4-glycol and 70 to 30 percent of an alkylene glycol of less than 4 carbon atoms and (3) about .1 to 6% by weight, based on the weight of the polyester, of a terminating agent having only one hydroxyl group as its sole active hydrogen-containing group for reaction with isocyanate and terminating in an alkyl group of at least 4 carbon atoms in its molecular chain.

9. A polyester-urethane composition comprising a rubbery reaction product of (1) about 0.9 to 1.5 equivalent weights of an organic polyisocyanate having 2 to 3 isocyanate groups, the major portion of which is an organic diisocyanate (2) about one equivalent weight of a dihydroxy terminated polyester having a molecular weight of at least 500 prepared from reaction of an organic aliphatic dicarboxylic acid of 5 to 11 carbon atoms with a mixture of glycols consisting essentially of about 30 to 70 mole percent butylene-1,4-glycol and 70 to 30 mole percent of an alkylene glycol of less than 4 carbon atoms and (3) about .1 to 6% by weight of N-butyl diethanol amine based on the weight of the polyester.

10. A polyester-urethane composition comprising a rubbery reaction product of (1) about 0.9 to 1.5 equivalent weights of an organic polyisocyanate having 2 to 3 isocyanate groups, the major portion of which is an organic diisocyanate and (2) about one equivalent weight of a dihydroxy terminated polyester having a molecular weight of at least 500 which is a reaction product of an organic aliphatic dicarboxylic acid of 5 to 11 carbon atoms with a mixture of glycols consisting essentially of about 30 to 70 mole percent of butylene-1,4-glycol and 70 to 30 mole percent of an alkylene glycol of less than 4 carbon atoms and (3) about .1 to 6% by weight of 2-ethyl butanol-1 based on the weight of the polyester.

11. A polyester-urethane composition comprising a rubbery reaction product of about 0.9 to 1.5 equivalent weights of an organic polyisocyanate having 2 to 3 isocyanate groups, the major portion of which is an organic diisocyanate and one equivalent weight of a dihydroxy terminated polyester having a molecular weight of at least 500 prepared from reaction of an organic aliphatic dicarboxylic acid having 5 to 11 carbon atoms with a mixture of glycols consisting essentially of about 30 to 70 mole percent of butylene-1,4-glycol and 70 to 30 percent of alkylene glycol of less than 4 carbon atoms and about 2 to 30 parts by weight based on the weight of said reaction product of a plasticizer therefor comprising a liquid polypropylene adipate terminated with octyl alcohol.

12. A solid, non-porous polyester-urethane composition comprising a rubbery reaction product of about 0.9 to 1.5 equivalent weights of an organic polyisocyanate having 2 to 3 isocyanate groups, the major portion of which is an organic diisocyanate, and about one equivalent weight of a dihydroxy terminated polyester having a molecular weight of at least 500, which is a reaction product of an aliphatic dicarboxylic acid having 5 to 11 carbon atoms with a mixture of glycols consisting essentially of about 30 to 70 mole percent of butylene-1,4-glycol and 70 to 30 mole percent of an alkylene glycol of less than 4 carbon atoms.

References Cited in the file of this patent

UNITED STATES PATENTS

| | | |
|---|---|---|
| 2,621,166 | Schmidt et al. | Dec. 9, 1952 |
| 2,760,953 | Seeger | Aug. 28, 1956 |
| 2,782,172 | Bruce | Feb. 19, 1957 |